(12) United States Patent
Cumpson et al.

(10) Patent No.: US 6,580,687 B1
(45) Date of Patent: Jun. 17, 2003

(54) DEVICE FOR POSITIONING A TRANSDUCING HEAD BY MEANS OF A DRIVE AND A MICROACTUATOR

(75) Inventors: Stephen Rodney Cumpson, Eindhoven (NL); Peter Hidding, Eindhoven (NL); Murray Fulton Gillies, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/706,673

(22) Filed: Nov. 6, 2000

(30) Foreign Application Priority Data

Nov. 8, 1999 (EP) .............................. 99203698

(51) Int. Cl.$^7$ ................................. G11B 5/60
(52) U.S. Cl. .................. 369/300; 360/294.4; 360/294.6
(58) Field of Search ...................... 360/294.4, 294.3, 360/294.5, 294.6, 234.9; 369/300

(56) References Cited

U.S. PATENT DOCUMENTS 5,745,319 A    4/1998  Takekado et al. ............. 360/78
5,943,189 A    8/1999  Boutaghou et al. ......... 360/103
6,181,531 B1 * 1/2001  Koshikawa et al. ...... 360/294.4

FOREIGN PATENT DOCUMENTS

WO    WO9827547    6/1998

* cited by examiner

Primary Examiner—Robert S. Tupper
(74) Attorney, Agent, or Firm—Laurie E. Gathman

(57) ABSTRACT

A device for positioning a transducing head (14) over a selected track of a rotatable information disc. The device includes a slider (12) supporting the transducing head, a carrier supporting the slider, a drive for moving the carrier to effect coarse radial positioning of the transducing head with respect to said selected track and a microactuator (18) to effect fine radial positioning (F) of the transducing head with respect to said selected track. The slider is provided with a swinging element carrying the transducing head and the microactuator is arranged to move the swinging element. In order to obtain a compact device with a swinging element of small mass, the swinging element is an internal tongue-shaped portion (12b) of the slider, the transducing head being secured to a free end part (12ba) of said tongue-shaped portion. The tongue-shaped portion extends in a recess (16) of the slider in which recess the tongue-shaped portion is swingable and in which recess the microactuator is provided.

14 Claims, 2 Drawing Sheets

DEVICE FOR POSITIONING A TRANSDUCING HEAD BY MEANS OF A DRIVE AND A MICROACTUATOR

This application claims priority to European Patent Application No. 992036898.8 filed Nov. 8, 1999.

BACKGROUND OF THE INVENTION

A device for positioning a transducing head by means of a drive and a microactuator.

The invention relates to a device for positioning a transducing head over a selected track of a rotatable information disc, the device including a slider supporting the transducing head, a carrier supporting the slider, a drive for moving the carrier to effect coarse radial positioning of the transducing head with respect to said selected track and a microactuator to effect fine radial positioning of the transducing head with respect to said selected track, the slider being provided with a swinging element carrying the transducing head, the microactuator being arranged to move the swinging element.

Such a device is known from U.S. Pat. No. 5,943 184. The known device is provided with an actuator arm carrying a slider. The slider includes a main portion having an air-bearing surface, and a distal portion to which a transducing head is fixed. The main portion and the distal portion are separated by a slot and interconnected by means of a hinge. A microactuator is disposed on the hinge, which microactuator is responsive to electrical control signals to selectively bend the hinge to alter the position of the head with respect to the main portion in order to make minor adjustments in the radial position of the head over a disc. The known slider composed of the main portion and the protruding distal portion is rather bulky.

The trend in optical and magnetic storage is towards high track densities since increases in linear density are becoming more difficult to realize. A high track density storage requires track following servo systems which have high bandwidths. In this context a disadvantage of the known device is that the distal portion of the slider, i.e. that portion of the slider that is actuated during operation, has a relatively high mass.

SUMMARY OF THE INVENTION

It is an object of the invention to provide a device of the kind defined in the opening paragraph in which the mass of the swinging element is relatively small.

This object is achieved by a variant of the device according to the invention which is characterized in that the swinging element is an internal tongue-shaped portion of the slider, the transducing head being secured to a free end part of said tongue-shaped portion, the tongue-shaped portion extending in a recess of the slider, in which recess the tongue-shaped portion is swingable and in which recess the microactuator is provided. The transducing head may be a write and/or read head, particularly a thin film magnetic head.

In the device according to the invention the microactuator needs only to move the tongue-shaped portion carrying the transducing head and being part of the slider in order to obtain a fine radial position of the head. Therefore, the mass of the objects moving during fine positioning is relatively small, offering the possibility of a relatively large bandwidth of a track following control system. Due to the internal tongue-shaped portion which is virtually a fully integrated part of the slider, the slider is very compact. In the device according to the invention microactuating occurs in a region which is very near to the region of measurement of the position error signal, which last mentioned region is located close to the transducing head. This effect yields an accurate positioning of the transducing head. The amount of microactuation required at the location of a selected track is in the region of a few micrometers, corresponding to the magnitude of the non-repeatable run-out of bearings normally used to bear information discs.

It is to be noted that a device for positioning a transducing head over a selected track is also known from WO-A 98/27547. This document discloses a head flexure assembly for positioning a transducing head over a track of a rotatable disc in a disc drive system. The assembly has an arm, a voice coil motor to rotate the arm and a flexure connected to the arm by means of a microactuator arranged between the arm and the flexure. A slider carrying a transducing head is attached to the flexure. In operation the voice coil motor is operated to move the arm around an axis, thereby moving the slider and the transducing head between tracks of the disc in order to realize a coarse radial position of the transducing head with respect to the track. In order to obtain a fine radial position of the head the microactuator is operated causing a radial movement of the flexure and the slider, thereby changing the position of the magnetic head with respect to the track.

A disadvantage of the known head flexure assembly is that the portion of the assembly that is actuated during operation has a relatively high mass. A further disadvantage that is there is a considerable distance between the place of microactuating and the point of measurement of the position error signal, because the distance between the microactuator and the transducing head, i.e. roughly the length of the flexure used, is relatively large. Due to this distance errors in the position of the transducing head occur during operation.

An embodiment of the device according to the invention is characterized in that the microactuator is a piezoelectric actuator. A piezoelectric actuator is very suitable to cause small movements. In a practical embodiment the piezoelectric actuator has two actuator units, the tongue-shaped portion extending between these units.

A practical embodiment of the device according to the invention is characterized in that the carrier supporting the slider includes a pivotable arm.

The object afore-mentioned is also achieved by another variant of the device according to the invention which is characterized in that the swinging element is a swingable tongue-shaped portion of the slider, the transducing head being secured to a free end part of said tongue-shaped portion, the tongue-shaped portion bounding a recess of the slider in which recess the microactuator is provided. Also in this device the mass of objects moving during fine positioning is relatively small. Preferably the microactuator is a piezoelectric actuator.

In the device according to the invention the microactuator performs during operation forces which are perpendicular to the body of the tongue-shaped element in order to divert this element in a direction perpendicular to a selected track.

The invention further relates to an apparatus for writing information into and/or reading information from a rotatable disc having a plurality of tracks, which apparatus is provided with a device for positioning a transducing head over a selected track of a rotatable information disc.

The apparatus according to the invention has a frame and is provided with an information disc rotatably mounted in the frame or with a turntable mounted in the frame for supporting a rotatable information disc, which apparatus is further provided with a driving unit for rotating the disc and with the device according to the invention, the device being mounted in the frame.

With reference to the Claims, it is to be noted that various characteristic features as defined in the Claims may occur in combination.

The above-mentioned and other aspects of the invention are apparent from and will be elucidated, by way of non-limitative example, with reference to the embodiments described hereinafter.

DETAILED DESCRIPTION OF THE PREFERRED EMBODIMENTS

Figure 1:
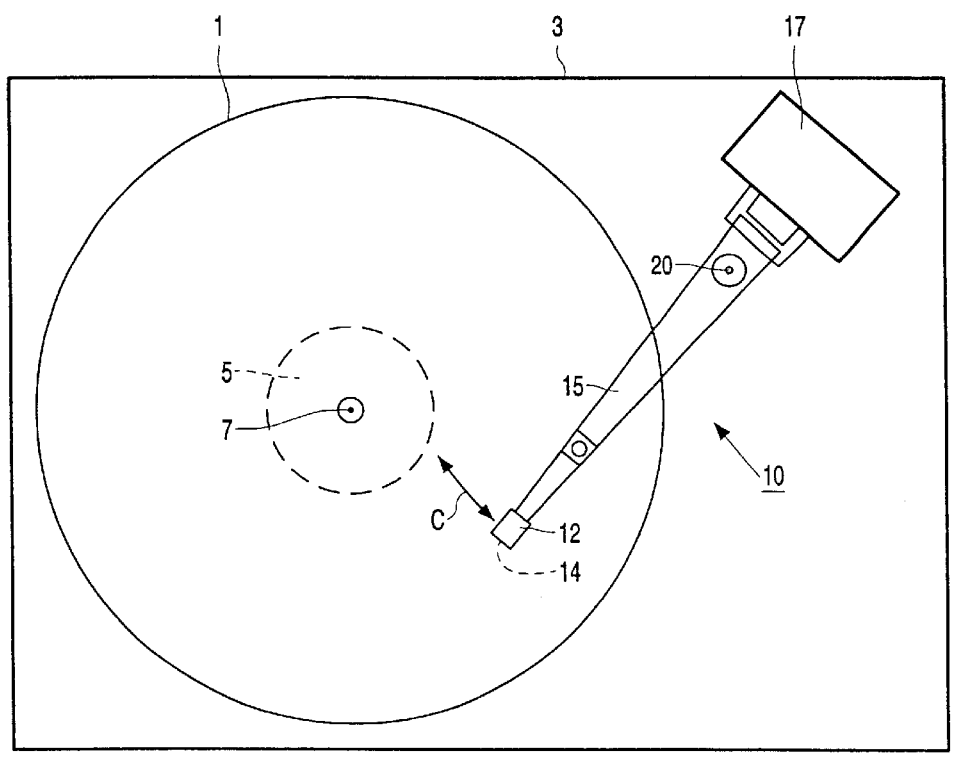
FIG. 1 shows diagrammatically in a top view an embodiment of the apparatus according to the invention.

The embodiment of the apparatus according to the invention shown in FIG. 1 is an apparatus for writing information in and reading information from a hard disc 1 having concentric or nearly concentric information tracks. The apparatus has a frame 3 and is provided with the hard disc 1 which is rotatably mounted in the frame 3 and is drivable by an electromotor 5 around a rotation axis 7. Alternatively, the hard disc can be put onto a turntable rotatably mounted in the frame and drivable by an electromotor. The apparatus is further provided with an embodiment 10 of the device according to the invention, which device serves for positioning a transducing head over a selected track of the hard disc.

Figure 2:
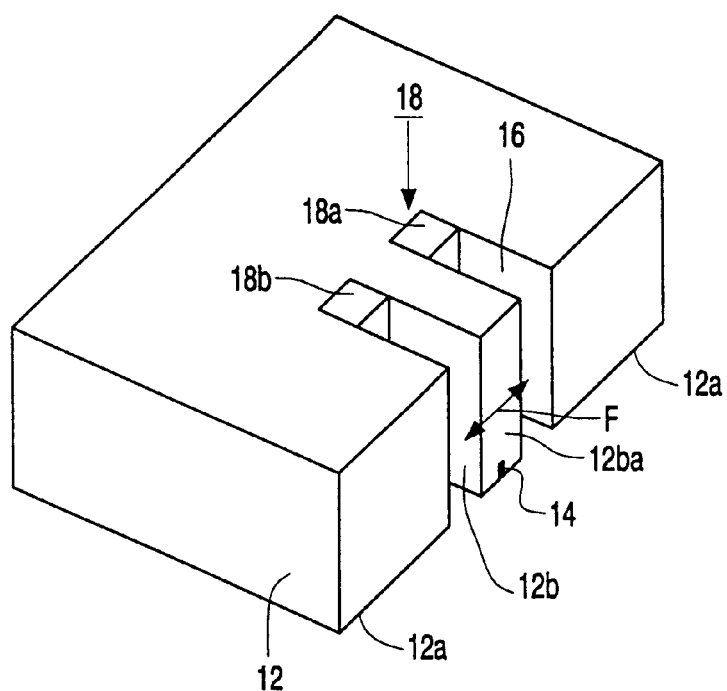
FIG. 2 shows diagrammatically in a perspective view a portion of a first embodiment of the device according to the invention and FIG. 3 shows diagrammatically in a perspective view a portion of a second embodiment of the device according to the invention.

With reference to the FIGS. 1 and 2 the embodiment 10 is provided with a slider 12 having an air-bearing surface 12a. The device 10 is further provided with a carrier being an arm 15 supporting the slider 12. A drive 17 of the device 10 serves to turn the arm 15 around a pivot 20 to effect coarse radial positioning—in accordance with arrow C—a transducing head 14 with respect to a selected track of the hard disc 1. The slider 12 includes an internal tongue-shaped portion 12b being a swingable integrated part of the slider. 12. The transducing head 14 is secured to a free end part 12ba of the tongue-shaped portion 12b. The tongue-shaped portion extends in a recess 16 of the slider 12, in which recess 16, which has the form of a slot, a microactuator 18 is present. The microactuator 18 is a piezoelectric actuator having in this example two actuator units 18a and 18b, each positioned at one side of the tongue-shaped portion 12b such that the portion 12b extends between both units 18a and 18b. By energizing the microactuator 18 the end part 12ba of the tongue-shaped portion 12b swings in a selected direction of arrow F in order to effect fine radial positioning of the transducing head 14 with respect to a selected track of the hard disc 1. During energizing the microactuator 18 causes driving forces on the tongue-shaped portion 12b which forces are parallel to one of the directions according to arrow F and thus in a moving direction of the end part 12ba of the tongue-shaped portion 12b in order to move the transducing head 14 in said direction.

Figure 3:
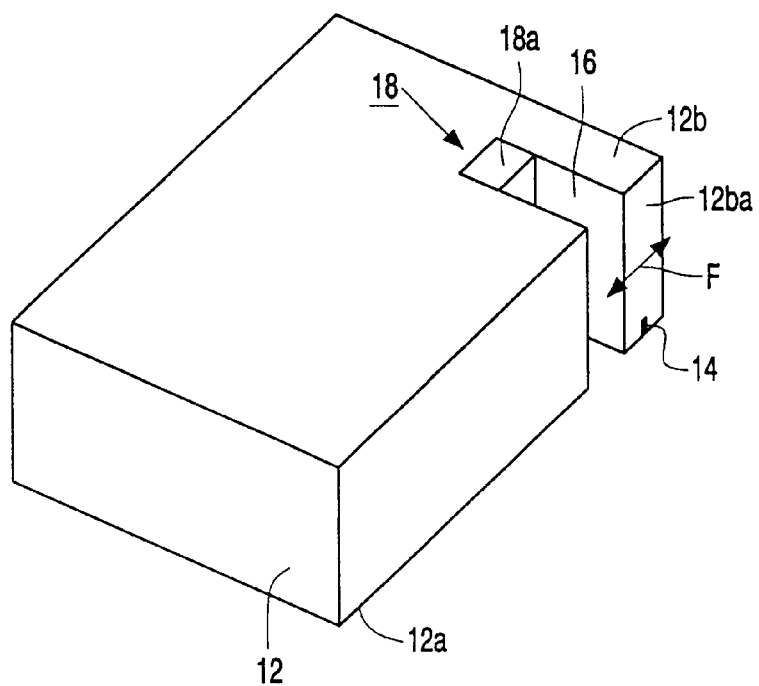

The device according to the invention shown in FIG. 3 deviates from the device shown in the FIGS. 1 and 2 in that the swinging element 12b of the slider 12 bounds the recess 16. Furthermore the microactuator 18 has only one actuator unit 18a. For the rest the construction and functioning of the device shown in FIG. 3 may be the same as the construction of the device shown in the FIGS. 1 and 2. For this reason the reference signs in FIG. 3 have the same meaning as the corresponding reference signs in FIG. 2.

The apparatus shown is a data apparatus, but may be, for example, an audio and/or video apparatus. Variants of the devices shown may also be possible within the scope of the invention.

What is claimed is:

1. A device for positioning a transducing head over a selected track of a rotatable information disc, the device including a slider supporting the transducing head, a carrier supporting the slider, a drive for moving the carrier to effect coarse radial positioning of the transducing head with respect to said selected track and a microactuator to effect fine radial positioning of the transducing head with respect to said selected track, the slider being provided with a swinging element carrying the transducing head and the microactuator being arranged to move the swinging element wherein the swinging element is an internal tongue-shaped portion of the slider, the transducing head being secured to a free end part of said tongue-shaped portion, the tongue-shaped portion extending in a recess of the slider in which recess the tongue-shaped portion is swingable and in which recess the microactuator is provided.

2. A device as claimed in claim 1, wherein the microactuator is a piezoelectric actuator.

3. A device as claimed in claim 2, wherein the piezoelectric actuator has two actuator units, the tongue-shaped portion extending between these units.

4. A device as claimed in claim 1, wherein the carrier supporting the slider includes a pivotable arm.

5. An apparatus for writing information in and/or reading information from a rotatable disc having a plurality of tracks, which apparatus has a frame and is provided with an information disc rotatably mounted in the frame or with a turntable mounted in the frame for supporting a rotatable information disc, which apparatus is further provided with a driving unit for rotating the disc and with the device as claimed in claim 1, the device being mounted in the frame.

6. A device for positioning a transducing head over a selected track of a rotatable information disk, comprising:
   a slider body having two recesses within the slider body on opposite sides of a tongue-shaped extension projecting from the slider body and defining the tongue-shaped extension; and
   a piezoelectric microactuator within at least one of the two recesses and selectively operable to produce rotational movement of the tongue-shaped extension.

7. The device according to claim 6, wherein the piezoelectric microactuator within the at least one recess further comprises:
   a piezoelectric microactuator in each of the two recesses, each piezoelectric micro-actuator independently selectively operable to produce rotational movement of the tongue-shaped extension.

8. The device according to claim 6, wherein the two recesses are defined by portions of the slider body extending from a remainder of the slider body a same distance as the tongue-shaped extension.

9. The device according to claim 6, wherein the slider body further comprises:
   two extensions on opposite sides of the two recesses and having a length substantially equal to a length of the tongue-shaped extension.

10. The device according to claim 6, wherein the slider body further comprises:
   at least one extension i addition to the tongue-shape extension, the at least one extension defining the recess with the tongue-shape extension.

11. The device according to claim 6, wherein the slider body further comprises:
   two extensions in addition to the tongue-shaped extension, the two extensions defining recesses, including the at least one recess, with the tongue-shaped extension.

12. The device according to claim 6, further comprising:
   a carrier supporting the slider and including a pivotable arm.

13. A magnetic disk drive comprising the device according to claim 6 for positioning the transducing head over the selected track of the rotatable information disk.

14. An optical disk drive comprising the device according to claim 6 for positioning the transducing head over the selected track of the rotatable information disk.

* * * * *